United States Patent
Laumeier et al.

(10) Patent No.: US 9,504,200 B2
(45) Date of Patent: Nov. 29, 2016

(54) RECHOPPER

(71) Applicant: CLAAS SELBSTFAHRENDE ERNTEMASCHINEN GMBH, Harsewinkel (DE)

(72) Inventors: Ludger Laumeier, Rietberg (DE); Ingo Boenig, Guetersloh (DE)

(73) Assignee: CLAAS Selbstfahrende Erntemaschinen GmbH, Harsewinkel (DE)

( * ) Notice: Subject to any disclaimer, the term of this patent is extended or adjusted under 35 U.S.C. 154(b) by 297 days.

(21) Appl. No.: 14/305,325

(22) Filed: Jun. 16, 2014

(65) Prior Publication Data
US 2014/0366500 A1 Dec. 18, 2014

(30) Foreign Application Priority Data

Jun. 18, 2013 (DE) .................. 10 2013 106 296

(51) Int. Cl.
*B02C 4/08* (2006.01)
*B02C 4/30* (2006.01)
*A01D 43/10* (2006.01)
*A01D 43/08* (2006.01)

(52) U.S. Cl.
CPC ............... *A01D 43/08* (2013.01); *A01D 43/10* (2013.01); *B02C 4/08* (2013.01); *B02C 4/30* (2013.01)

(58) Field of Classification Search
CPC .... A01D 43/08; A01D 43/081; A01D 82/02; B02C 18/22; B02C 13/22; B02C 4/08; B02C 4/30

USPC .................. 56/14.7, 229; 241/236, 293–295
See application file for complete search history.

(56) References Cited

U.S. PATENT DOCUMENTS

| | | | | | |
|---|---|---|---|---|---|
| 4,165,043 | A | * | 8/1979 | Higashi | B02C 18/182 241/236 |
| 5,207,392 | A | * | 5/1993 | Stangenberg | B02C 18/0007 241/236 |
| 5,678,774 | A | * | 10/1997 | Bennett | D01G 1/04 241/186.35 |
| 5,979,808 | A | * | 11/1999 | Vogelgesang | A01D 82/02 241/236 |
| 7,350,387 | B1 | * | 4/2008 | Lisk | B21D 31/046 241/236 |
| 2014/0166797 | A1 | * | 6/2014 | Den Boer | A01D 43/10 241/296 |

FOREIGN PATENT DOCUMENTS

| | | | | |
|---|---|---|---|---|
| DE | 102012112265 A1 | * | 6/2014 | ............. A01D 43/10 |
| EP | 0 525 422 | | 2/1993 | |
| EP | 1 101 397 | | 5/2001 | |

* cited by examiner

*Primary Examiner* — John G Weiss
(74) *Attorney, Agent, or Firm* — Michael J. Striker

(57) ABSTRACT

A rechopper for chopped crop includes first and second rollers having axially parallel rotational axes, peripheral surfaces disposed opposite one another delimiting a comminution gap and truncated-cone shaped sections. The truncated cone-shaped sections have a base surface (G, G'), a top surface (D, D') and peripheral surfaces extending at a slant relative to the rotational axis of the respective roller. The base surface (G, G') and the top surface (D; D;) disposed on the first roller and the second roller have diameters that vary in an alternating manner as viewed in an axial direction (R).

14 Claims, 4 Drawing Sheets

RECHOPPER

CROSS-REFERENCE TO A RELATED APPLICATION

The invention described and claimed hereinbelow is also described in German Priority Document DE 10 2013 106296.2, filed on Jun. 18, 2013. The German Priority Document, the subject matter of which is incorporated herein by reference, provides the basis for a claim of priority of invention under 35 U.S.C. 119(a)-(d).

BACKGROUND OF THE INVENTION

The invention relates to broadly to a rechopper for chopped crop that includes first and second rollers having axially parallel rotational axes and peripheral surfaces disposed opposite one another, delimiting a comminution gap and provided with truncated-cone shaped sections, the sections having a base surface, a top surface and provided with peripheral surfaces extending at a slant relative to the rotational axis of the respective roller.

As is known, agricultural harvesting machines such as self-propelled forage harvesters are typically equipped with a rechopper when used to harvest corn. In this case, the rechopper also is referred to as a conditioning device or a corn cracker. Such a rechopper is used to further comminute the crop in a targeted manner, the crop previously comminuted by one or more processing assemblies, such as a chopping assembly. In harvesting corn, the purpose thereof is to prepare the crop for use as livestock feed or for biogas production.

To this end, known rechoppers typically comprise two rollers, which are driven in opposite directions, are disposed parallel to one another and are preloaded against one another, between which already chopped crop is directed to pound (corn) kernels contained in the chopped crop. This improves the digestibility of the subsequent feed for livestock and improving the usability of the crop for biogas production.

Very generally speaking, various requirements are placed on rechoppers. First, good processing quality should be ensured. This means that ideally all the kernels contained in the crop are reliably opened up. On the other hand, however, the crop should not be crushed into a pasty mass, but rather should retain a coarse structure and be well-compressible. Moreover, every effort should be made to prevent individual plant components such as husk leaves from passing through the rechopper without being shortened.

Given that the throughput rates of forage harvesters are high and continuously increase, the rechoppers used therein also must achieve increasingly high throughput rates. Therefore, the throughput rate that can be achieved and the drive power required therefor play a large role, and the drive power must be minimized for reasons of energy efficiency.

Document EP 0 525 422 A2, for example, describes a rechopper with two chopper rollers driven in opposite directions, each of which comprises a plurality of adjacently disposed, wedge-shaped sections, the base surface and top surface of which have the same diameter in every case. The sections are disposed on the respective roller in mirror images relative to one another in the axial direction. That is, a section having a peripheral surface rising in the axial direction is adjoined by a section having a peripheral surface falling in the axial direction, and vice versa. The arrangement of the sections on the rollers disposed opposite one another is complementary. The disadvantage of this arrangement is that prepared chopped crop can often cause blockages in the downstream discharge system, which limits the throughput rate.

Document EP 1 101 397 A1 makes known a rechopper having rollers with wedge-shaped sections, the base surface and top surface of which have the same diameter in every case. As viewed in the axial direction, the sections are alternately disposed such that the base surface of one section always bears against the top surface of the adjacent section. The resulting arrangement is shaped somewhat like a Christmas tree. The arrangement of the sections on the rollers disposed opposite one another is complementary in this case as well. A disadvantage of this design is that, due to the acute angles of the sections, highly complex production engineering is required in order to obtain toothing that works together effectively. A further disadvantage is that, due to the large overlap of oppositely disposed sections in the radial direction, a very large cutting gap forms, into which material can be pressed, which results in an increased power requirement for driving the rechopper. In addition, the selected orientation of the arrangement of the sections on the rollers results in an axial force, which additionally loads the bearings of the rechopper.

SUMMARY OF THE INVENTION

The present invention overcomes the shortcomings of known arts, such as those mentioned above.

To that end, the present invention provides a rechopper characterized by an increased processing quality of the crop even when throughput is high.

In an embodiment, the invention provides a rechopper for chopped crop that includes first and second rollers having axially parallel rotational axes and peripheral surfaces disposed opposite one another, delimiting a comminution gap and provided with truncated-cone shaped sections, the sections having a base surface, a top surface and provided with peripheral surfaces extending at a slant relative to the rotational axis of the respective roller.

The base surface and the top surface of the sections disposed on the first roller and second roller have diameters that vary in an alternating manner in the axial direction. This arrangement of the individual sections results in a lengthening of the effectively active comminution gap that forms between the rollers and results in an enlargement of the effective roller surface. Due to the variation in the diameters of the base surfaces of the sections, it is ensured that the sections do not need to engage into one another as deeply as is the case with the identically designed sections on the rollers according to the aforementioned prior art.

Preferably, at least two types of sections having different diameters of the respective base surface and top surface thereof are disposed on the rollers. The number of variations of sections is therefore reduced to a minimum number of identical parts that is required for the structure of the rollers.

In this case, a section having a peripheral surface falling in the axial direction is can be disposed next to a section having a peripheral surface rising in the axial direction, in an alternating manner on the first roller, and, opposite thereto, a section having a peripheral surface rising in the axial direction can be disposed next to a section having a peripheral surface falling in the axial direction, in an alternating manner on the second roller. This arrangement of the sections on the rollers makes it possible to eliminate the axial force, thereby at least reducing the additional loading of the bearings of the rechopper.

Advantageously, sections disposed on the second roller in a complementary manner are disposed opposite the sections on the first roller such that a shear gap forms between the end faces of the opposing sections that overlap one another in the radial direction. By this measure, the comminution of the crop is performed not only by the comminution gaps that are slanted relative to the rotational axis, but also by shear gaps extending in the radial plane. Each section of a roller comprises end faces that form a shear gap, thereby ensuring that relatively long plant components such as husk leaves, for example, are cut in a reliable and energy-saving manner at regular intervals as viewed across the axial width of the rollers. The portion of excessive lengths in the crop is thereby reliably reduced.

The respective shear gap forms between the base surface of a section on the first roller and the top surface of a section on the second roller. This is achieved in that the shear gaps are formed by subregions of the base surface and the top surface of a respective section of the first roller. These subregions are located outwardly in the radial direction of the roller, wherein the outwardly located subregions of the base surface and the top surface of a respective section of the second roller are offset in the axial direction relative thereto.

The particular advantage resulting from the arrangement of the sections is that the respective shear gap has a shallower depth in the radial direction, which is determined by the proportion of the sections that are disposed opposite one another in a complementary manner and have different diameters of the base surface. In this manner, the amount of material entering the cutting gap and, therefore, the energy demand, can be at least reduced.

Moreover, the peripheral surfaces of at least a few sections can have a profiled structure, at least in regions, in particular toothing, knurling, a helical groove, or the like, or a combination of profiled structures.

The profiled structure is designed as conical toothing in particular. Conical toothing is formed on the peripheral surfaces of the sections by varying the diameter of the base surfaces of the sections. As such, a section having a large diameter of the base surface has crude toothing proceeding from the base surface and extending to moderate toothing on the top surface, while a section having a small diameter of the base surface has moderate toothing proceeding from the base surface and extending to a fine toothing on the top surface. This combination of toothing on the peripheral surfaces of the sections on the rollers is effective in terms of crop uptake and crop preparation.

The conical toothing has a constant tooth thickness. Due to the constant tooth thickness, the width and depth of the tooth gaps of adjacent teeth vary. The varying tooth gaps results in different toothings on the particular peripheral surface of a section in the axial direction thereof, i.e., toothings having less pronounced regions and finer regions. This results in the advantage that sharp cutting edges form on the peripheral surface, while blunt regions, which could impair the crop uptake, do not.

In an advantageous development, a section having a larger diameter of the base surface has less pronounced toothing than a section disposed opposite this section in a complementary manner and, has a smaller diameter of the base surface. The arrangement of the crude toothing on the sections having a larger diameter of the base surface results in the crop initially coming into contact with this section, thereby improving the crop uptake. The finer toothing on the section having the smaller diameter of the base surface enables grains in the crop to be opened up more reliably.

Preferably, the rollers have a segmented design, in that the respective sections of the first and the second roller are each designed as individual annular disks, which are axially mounted on a cylindrical base body in a repeating sequence. Cost-effective production is achieved as a result in that the sections of a roller are formed on annular bodies that are axially mounted on the cylindrical base body in a repeating sequence. A suitable securing of the annular bodies on the base body, for example, by parallel keys and/or axial clamping, is advantageous. The segmented roller design makes it possible to easily and even subsequently replace individual elements, for example in the case of wear.

In order to obtain a particularly low overall weight of the device, the base body, onto which the annular bodies are slid, is produced as a hollow body.

The present invention furthermore relates to an agricultural harvesting machine for processing and conveying crop (e.g., a self-propelled forage harvester), having an above-described rechopper according to the invention disposed downstream of a crop processing assembly.

BRIEF DESCRIPTION OF THE DRAWINGS

Further features and advantages of the invention will become apparent from the description of exemplary embodiments that follows, with reference to the attached figures, wherein.

DETAILED DESCRIPTION OF THE INVENTION

The following is a detailed description of example embodiments of the invention depicted in the accompanying drawings. The example embodiments are presented in such detail as to clearly communicate the invention and are designed to make such embodiments obvious to a person of ordinary skill in the art. However, the amount of detail offered is not intended to limit the anticipated variations of embodiments; on the contrary, the intention is to cover all modifications, equivalents, and alternatives falling within the spirit and scope of the present invention, as defined by the appended claims.

Figure 1:
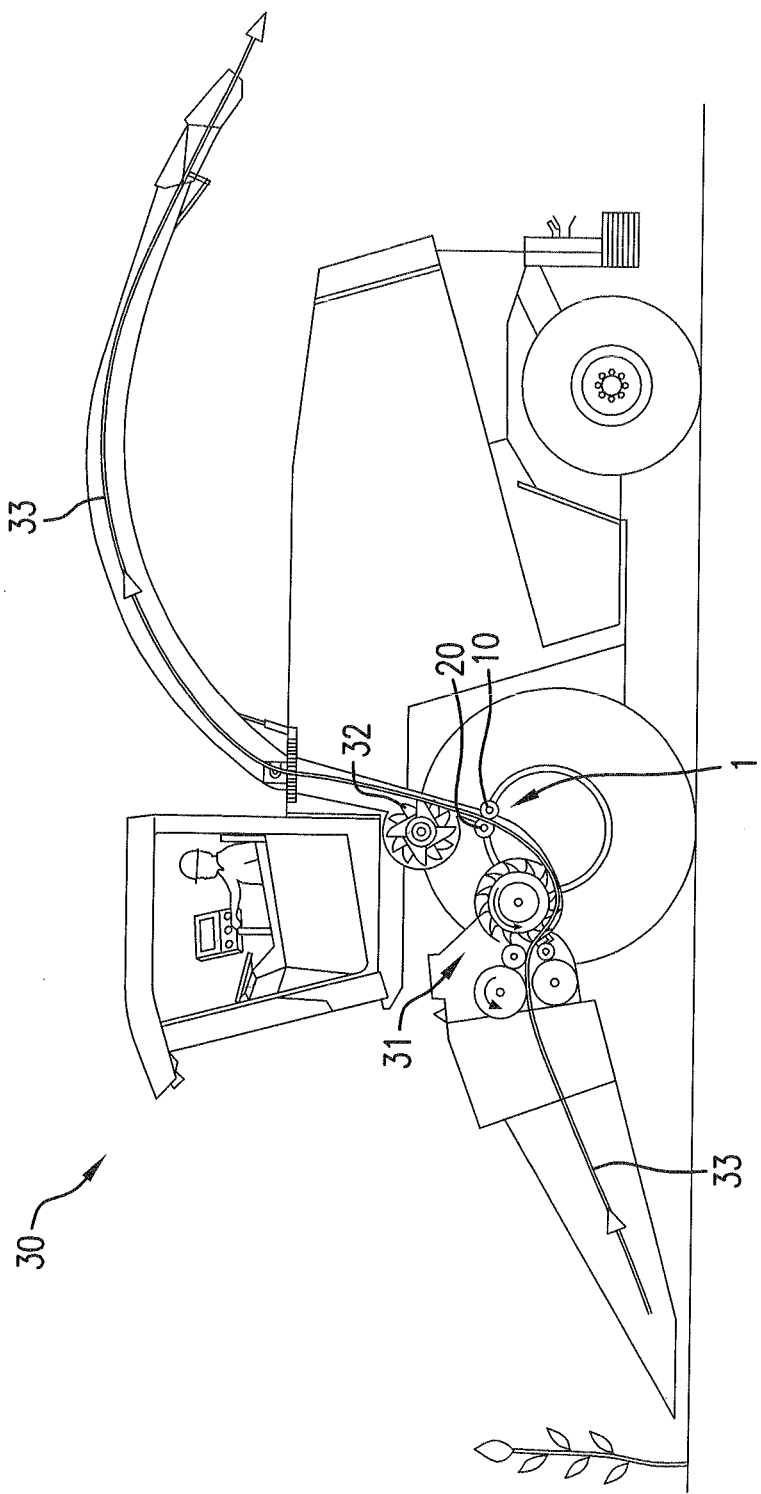
FIG. 1 depicts an agricultural harvesting machine in a schematic side view.

FIG. 1 shows an agricultural harvesting machine in the form of a self-propelled forage harvester 30, in a schematic side view. The forage harvester 30 is equipped in a manner known per se (and which is therefore not described in greater detail) with front and rear wheels and a main drive motor. The drive motor drives the front and rear wheels (among other things), in order to travel across a field in order to harvest a plant stand. The plant stand is drawn into the machine by a harvesting attachment mounted on the front, whereupon this plant stand is subsequently conveyed in a form of a stream of crop 33 (indicated by a solid line provided with arrows and extending through the forage harvester 30), through the forage harvester 30 and processed, i.e., chopped up, by various conveying and/or processing assemblies.

Rotating feed rollers disposed in pairs compress the crop 33 so that the crop 33, upon passage through a downstream chopping assembly 31, is chopped into small particles via the interaction of a rotating chopper drum, which is equipped with knives, and a shear bar. The thusly chopped crop 33 passes through a conveyor chute, which rises behind the chopper drum and into the range of action of a rechopper 1.

This rechopper 1 comprises two rollers 10, 20, which are driven so as to rotate in opposite direction, are preloaded against one another and have rotational axes that are parallel to one another. Crop 33 that travels through a passage (the direction of rotation of each roller 10, 20 promotes the direction of crop flow) formed between the rollers 10, 20 is processed under the mechanical influence of the roller surfaces (see FIGS. 2-4). In the corn harvesting, the purpose of the further processing is to open up corn kernels contained in the chopped crop 33 to improve the digestibility of the subsequent feed for animals or the usability of the crop for biogas production.

After passing through the rechopper 1, the crop 33 finally reaches the range of action of a discharge accelerator 32, which accelerates the crop 33 once more before entry thereof into an upper discharge chute. This ensures reliable conveyance through the upper discharge chute and, subsequently, reliable discharge for the purpose of transfer to a hauling vehicle, for example.

Figure 2:
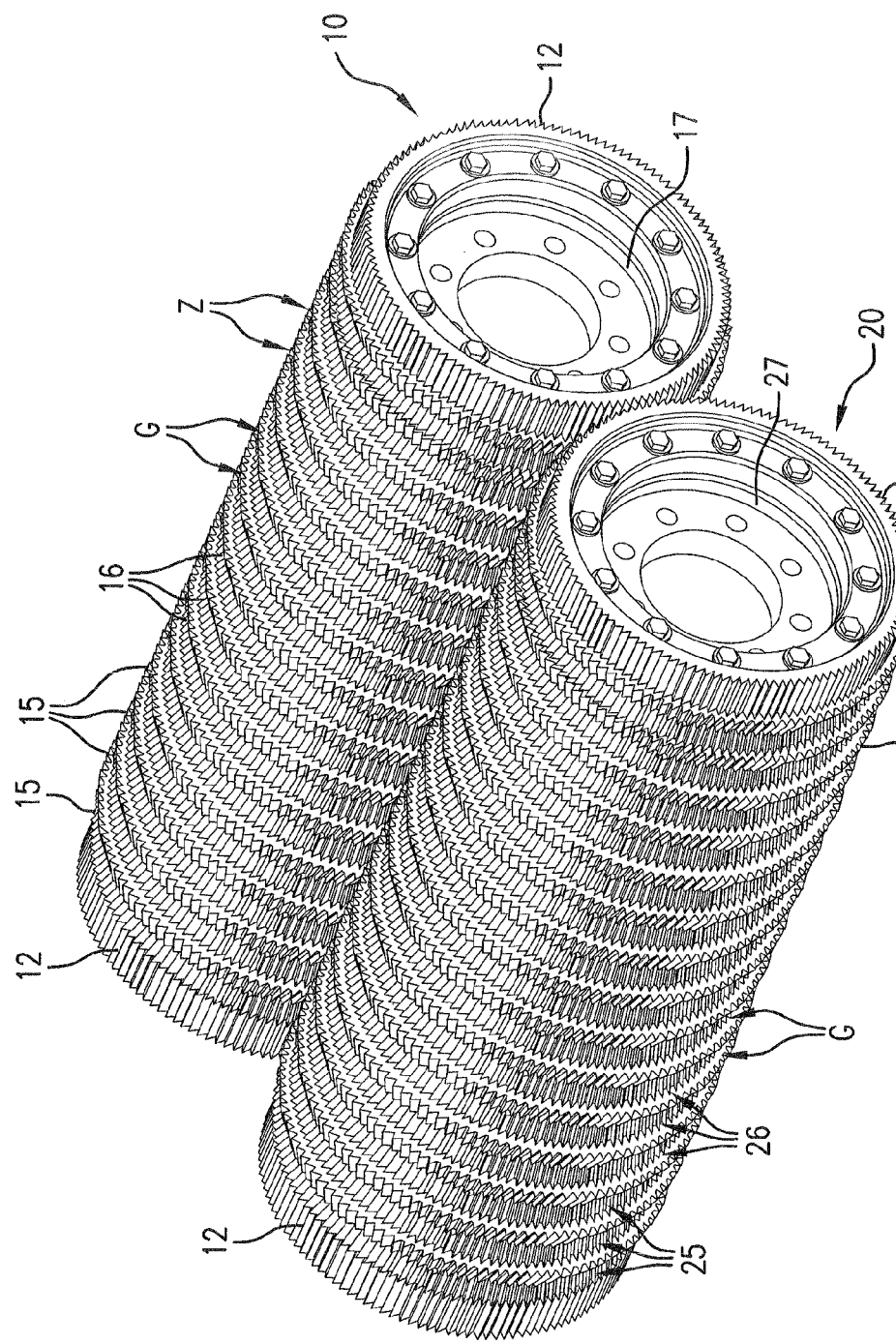
FIG. 2 depicts an inventive rechopper in a view at an angle from the front.
Figure 3:
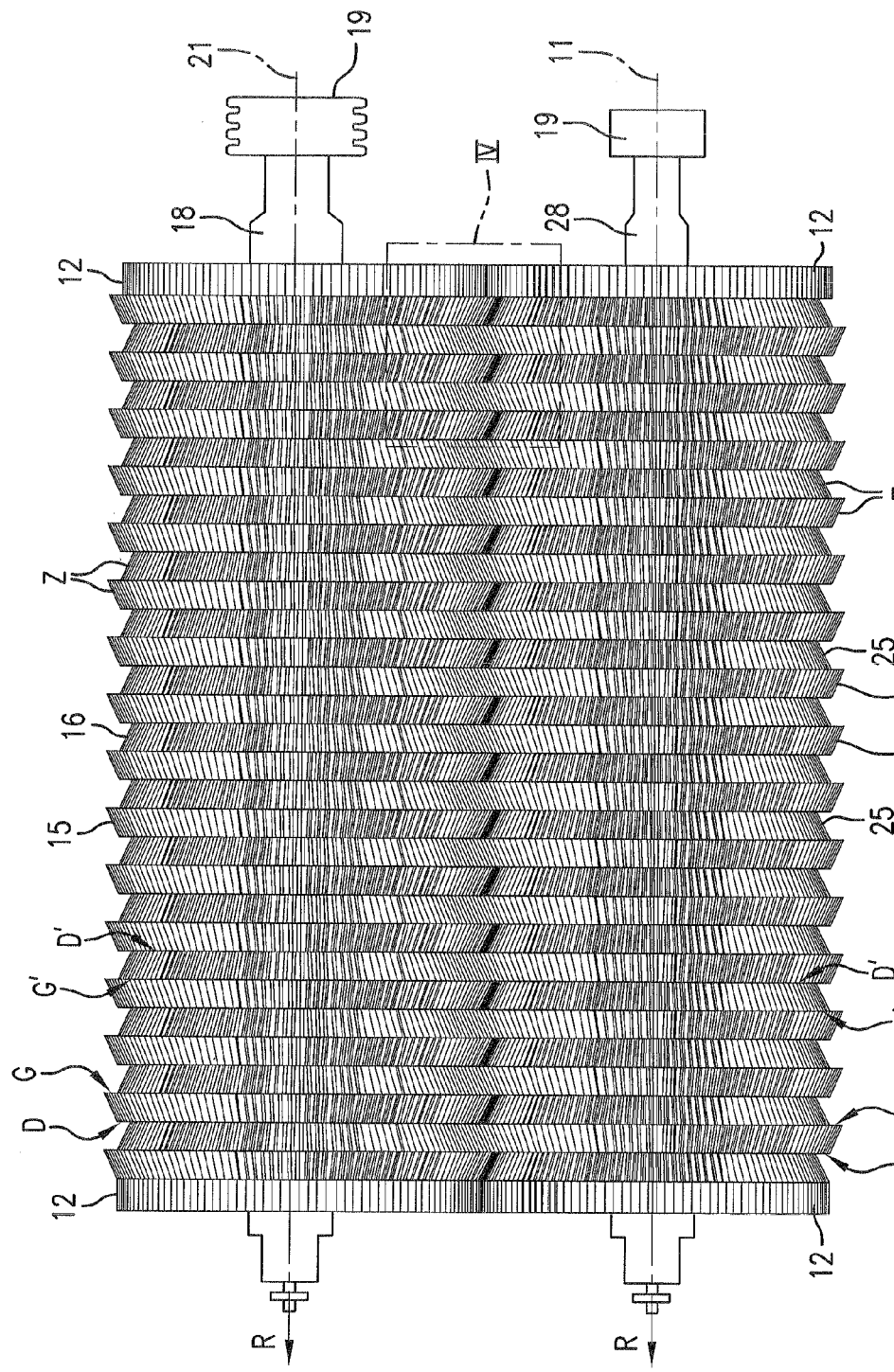
FIG. 3 depicts the rechopper presented in FIG. 2, in a partial view from above.
Figure 4:
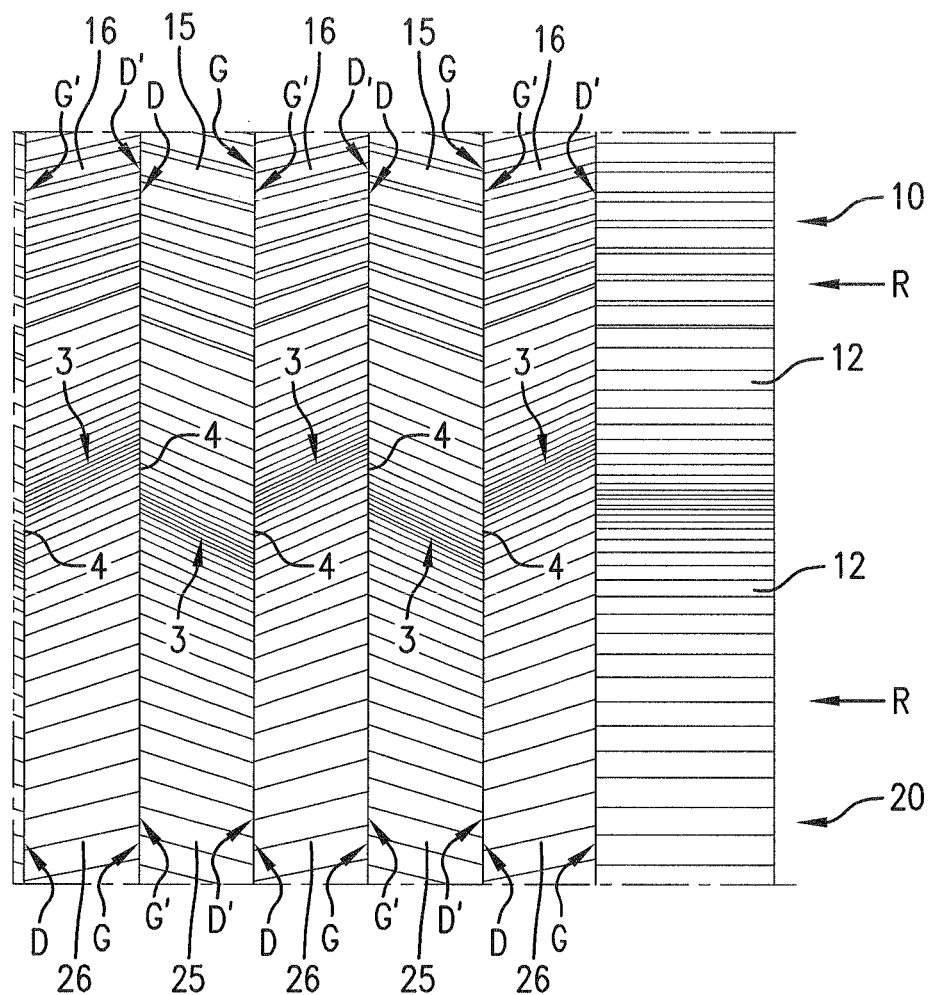
FIG. 4 depicts a detailed view IV of the FIG. 3 rechopper.

In an embodiment, the rechopper 1 is advantageously installed in the forage harvester 30 according to FIG. 1, as now described in relation to FIGS. 2 to 4.

FIG. 2 shows a rechopper 1 according to the invention in a view at an angle from the front. The rechopper 1 substantially comprises two rollers 10, 20 having parallel rotational axes 11, 21 (FIG. 3). The rollers 10, 20 are each mounted on a shaft 18, 28, which extends out of the roller body at both axial ends of the rollers 10, 20 (as shown in FIG. 3). By the shafts 18, 28, the rollers 10, 20 are each rotatably supported relative to a common housing (which is not shown, for clarity) of the rechopper 1.

A pulley 19 is mounted on a long end of each of the shafts 18, 28 for the purpose of driving the rollers 10, 20. A drive belt wraps around the pulleys 19 such that the rollers 10, 20 rotate in opposite directions, wherein the direction of the peripheral speeds of the rollers 10, 20 in the engagement region of the rollers 10, 20 corresponds to the direction of conveyance of the crop 33 (see FIG. 1).

As shown in FIGS. 2 and 3, the rollers 10, 20 have a segmented design. In particular, the jacket surface of each roller 10, 20 is formed of a plurality of conical-disk shaped sections 15, 16; 25, 26, which are axially mounted in a repeating sequence on a cylindrical base body 17, 27. Each section 15, 16; 25, 26 has a base surface G, G' and a top surface D, D', by which the respective sections 15, 16; 25, 26 of the rollers 10, 20 bear against one another. The diameter of the base surface G, G' of each section 15, 16; 25, 26 is greater than the diameter of the corresponding top surface D, D', and therefore each section 15, 16; 25, 26 has a peripheral surface 2. Each peripheral edge extends at a slant relative to the respective rotational axis 11, 21 of the associated roller 10, 20. The base body 17, 27 is produced as a hollow body, thereby ensuring that a relatively low overall weight of each roller 10, 20 is obtained in combination with sufficient robustness. A solid base body could also be provided, as an alternative.

The sections 15, 16 are disposed next to one another in alternation in the axial direction R on the roller 10, while the sections 25, 26 on the roller 20 alternate in the axial direction R. In the radial outer region, that is, on the peripheral surface 2, each section 15, 16; 25, 26 is provided with a toothing Z, in particular a conical toothing (see also FIGS. 3, 4).

FIG. 3 shows the rechopper 1 according to FIG. 2 in a view from above. This FIG. 3 view clearly shows the structure of the rollers 10, 20. At the ends, the rollers 10, 20 are delimited by annular disks 12 disposed on each of the base bodies 17, 27, between which annular disks the respective sections 15, 16; 25, 26 of the rollers 10, 20 are disposed. The sections 15, 16 are disposed next to one another in alternation on the roller 10, as viewed from left to right in the axial direction. The arrangement of the sections 15, 16 relative to one another is selected such that the base surface G' of a section 16 bears against the base surface G of a section 15. The top surfaces D, D' of two adjacent sections 15, 16 are therefore disposed opposite one another.

The depiction in FIG. 3 furthermore clearly shows that the diameter of the base surface G of the section 15 is greater than the diameter of the base surface G' of the adjacent section 16. The same applies for the top surfaces D, D' of sections 15, 16 disposed adjacent to one another. On the first roller 10, therefore, a section 15 having a peripheral surface 2 rising in the axial direction R of the roller 10 is disposed, in an alternating sequence, next to a section 16 having a peripheral surface 2 falling in the axial direction R of the roller 10.

The design of the roller 20 is complementary to that of the roller 10 disposed axially parallel thereto. The arrangement of the sections 25, 26 relative to one another is selected such that the top surface D' of a section 26 bears against the top surface D of a section 25. The top surfaces D, D' of two adjacent sections 25, 26 are therefore disposed opposite one another. FIG. 3 furthermore clearly shows that the diameter of the top surface D of the section 25 is smaller than the diameter of the top surface D' of the adjacent section 26. The same applies for the base surfaces G, G' of sections 15, 16 disposed adjacent to one another. On the second roller 20, however, a section 25 having a peripheral surface 2 falling in the axial direction R of the roller is disposed, in an alternating sequence, next to a section 26 having a peripheral surface rising in the axial direction R of the roller.

Due to this alternating arrangement of sections 15, 16; 25, 26 in the axial direction of the roller 10, 20, respectively, and in the radial direction of the opposing rollers 10, 20, a shear gap 4 forms in each case in the regions of base surfaces G and top surfaces D. Base surfaces G and D overlap one another in the radial direction of the sections 15, 26, which are disposed opposite one another and are offset relative to one another in the axial direction of the respective roller 10, 20. By these shear gaps 4, crop 33 that enters these regions is cut in a particularly low-force and energy-saving manner. By this measure, in particular, components contained in the crop 33 having an excessive length (such as husk leaves) are reliably captured and chopped up.

Between the sections 15, 25 disposed opposite one another in a complementary manner, comminution gaps 3 form in each case between the slanted peripheral surfaces 2, which have an increased comminution effect due to the slanted course of the peripheral surfaces 2. The comminution gaps 3 that are formed are dimensioned such that these are smaller than corn kernels contained in the crop 33, in order to ensure that the kernels are reliably opened up.

The sections 15, 26 and the sections 16, 25 are designed as identical parts in each case in order to ensure that a comminution gap 3 is reliably formed between two sections 15, 25 or 16, 26, which are disposed opposite one another in a complementary manner. Production tolerances are specified for the manufacture of the sections 15, 26 and 16, 25 such that the sections 15, 26, which have a larger base surface G than the sections 16, 25, are produced with a negative tolerance in terms of the outer diameter thereof, while the sections 16, 25 are designed with a positive tolerance in terms of the outer diameter thereof.

The representation in FIG. 4 shows a detailed view VI according to FIG. 3. This representation more clearly shows the design of the rollers 10, 20. A section 16 having a top surface D' facing the annular disk 12 is disposed directly adjacent to the annular disk 12 on the roller 10. The base surface G' of this section 16 is adjoined by the base surface G of the section 15. This is followed, in turn, by a section 16, which bears via the top surface D' thereof, against the top surface D of the section 15 preceding this section 16. This structure continues, in an alternating manner, in the axial direction R of the roller 10.

The structure of the roller 20 is complementary to that of the roller 10. A section 26 having a top surface G facing the annular disk 12 is disposed adjacent to the annular disk 12 on the roller 20. The section 25 adjoins, via the top surface D' thereof, the top surface D of the section 26, which is directly adjacent the annular disk 12. This is followed, in turn, by a section 26, which bears via the base surface G thereof against the base surface G' of a section 25 adjacent to this section 26. The respective comminution gap 3 forms, in each case, between the slanted peripheral surfaces 2 of section pairs 15, 25; 16, 26 of the rollers 10, 20, which are disposed opposite one another. The respective shear gap 4 forms between the regions of the base surfaces G of the sections 15, 26, which overlap one another in the radial direction. The sections 15, 26 are disposed adjacent to one another in the axial direction R. The depth of the respective shear gap 4 is considerably less than that of the design of the rechopper known from EP 1 101 397 A1, which has an advantageous effect in terms of the power uptake of the rechopper 1, since less material can enter the shear gap 4.

A further aspect is the toothing Z on the peripheral surfaces 2 of the respective sections 15, 16; 25, 26. The sections 15, 26, similar to the sections 16, 25, are designed as identical parts, which reduces the production complexity and the production costs. The toothings Z of the sections 15, 26, which are designed as conical toothing, have a coarse toothing proceeding from the base surface G and extending toward a moderate toothing on the top surface D. In comparison, the sections 16, 25 have a moderate toothing proceeding from the base surface G' and extending toward a fine toothing on the top surface D'. The result thereof, in accordance with the above-described arrangement of the oppositely disposed sections 15, 25; 16, 26 of the rollers 10, 20, is a combination of a coarse and fine toothing of the oppositely disposed sections 15, 25; 16; 26. This proves particularly advantageous in terms of crop uptake and crop preparation. In particular, since the sections 15, 26 have a base surface G having a larger diameter than the base surface G' of the sections 16, 25 provided with the coarse toothing, the crop 33 first comes into contact with this region of the sections 15, 26, thereby further enhancing the crop uptake.

LIST OF REFERENCE CHARACTERS

1 rechopper
2 peripheral surface
3 comminution gap
4 shear gap
10 roller
11 rotational axis
12 annular disk
15 section
16 section
17 base body
18 shaft
19 pulley
20 roller
21 rotational axis
25 section
26 section
27 base body
28 shaft
30 forage harvester
31 chopping assembly
32 discharge accelerator
33 crop
D, D' top surface
G, G' base surface
R direction
Z toothing As will be evident to persons skilled in the art, the foregoing detailed description and figures are presented as examples of the invention, and that variations are contemplated that do not depart from the fair scope of the teachings and descriptions set forth in this disclosure. The foregoing is not intended to limit what has been invented, except to the extent that the following claims so limit that.

What is claimed is:

1. A rechopper for chopped crop (E), comprising
at least one first and at least one second roller having axially parallel rotational axes and peripheral surfaces disposed opposite one another delimiting a comminution gap;
wherein each of the at least one first and the second rollers is provided with truncated-cone shaped sections, which have a base surface (G, G') and a top surface (D, D') and are provided with peripheral surfaces extending at a slant relative to the rotational axis of the respective roller;
wherein the base surface (G, G') and the top surface (D; D;) of the truncated cone shaped sections disposed on the at least one first roller and the at least one second roller have diameters that vary in an alternating manner as viewed in an axial direction (R).

2. The rechopper (1) according to claim 1, wherein at least two of the truncated cone shaped sections have different diameters of the respective base surface (G, G') and top surface (D, D') thereof disposed on the rollers.

3. The rechopper according to claim 1, wherein a first section has a peripheral surface rising in the axial direction (R) and is disposed next to a second section having a peripheral surface falling in the axial direction (R), in an alternating manner on the first roller and, opposite thereto, a third section having a peripheral surface falling in the axial direction (R) is disposed next to a fourth section having a peripheral surface rising in the axial direction (R), in an alternating manner on the second roller.

4. The rechopper according to claim 3, wherein the first and second sections disposed on the second roller in a complementary manner are disposed opposite the first and second sections on the first roller such that a shear gap forms between the regions of the base surfaces G of the first and third sections, which overlap one another in the radial direction and are disposed adjacent to one another in the axial direction (R).

5. The rechopper according to claim 3, wherein the respective shear gap forms between the base surface (G) of the first section on the first roller and the top surface (D) of the fourth section on the second roller.

6. The rechopper according to claim 1, wherein the peripheral surfaces of at least a few of the truncated-cone shaped sections have a profiled structure, at least in regions.

7. The rechopper according to claim 6, wherein the profiled structure is designed as conical toothing.

8. The rechopper according to claim 7, wherein the conical toothing has a constant tooth thickness.

9. The rechopper according to claim 4, wherein that one of the first and fourth sections having a larger diameter of the base surface (G) has a less pronounced profiled structure than one of the second and third sections disposed opposite thereto in a complementary manner and, a smaller diameter of the base surface (G).

10. The rechopper according to claim 1, wherein rollers have a segmented design such that the respective truncated-cone shaped sections of the first and second roller are each designed as individual annular disks that are axially mounted on a cylindrical base body in a repeating sequence.

11. The rechopper according to claim 10, wherein the base body is designed as a hollow body.

12. The rechopper according to claim 1, wherein annular bodies having a peripheral surface extending parallel to a rotational axis of the rollers are disposed between the truncated-cone shaped sections.

13. An agricultural harvesting machine for processing and conveying crop (E) comprising a rechopper disposed downstream of a crop processing assembly (31), the rechopper comprising:
  at least one first and at least one second roller having axially parallel rotational axes and peripheral surfaces disposed opposite one another delimiting a comminution gap;
  wherein each of the at least one first and the second rollers is provided with truncated-cone shaped sections, which have a base surface (G, G') and a top surface (D, D') and are provided with peripheral surfaces extending at a slant relative to the rotational axis of the respective roller;
  wherein the base surface (G, G') and the top surface (D; D;) of the truncated cone shaped sections disposed on the at least one first roller and the at least one second roller have diameters that vary in an alternating manner as viewed in an axial direction (R).

14. The rechopper according to claim 13, wherein the agricultural harvesting machine is a self-propelled forage harvester (30).

* * * * *